(12) United States Patent
Kurihara et al.

(10) Patent No.: US 11,225,962 B2
(45) Date of Patent: Jan. 18, 2022

(54) CAPACITY CONTROL VALVE

(71) Applicant: EAGLE INDUSTRY CO., LTD., Tokyo (JP)

(72) Inventors: Daichi Kurihara, Tokyo (JP); Yoshihiro Ogawa, Tokyo (JP); Keigo Shirafuji, Tokyo (JP); Kohei Fukudome, Tokyo (JP); Masahiro Hayama, Tokyo (JP); Takahiro Ejima, Tokyo (JP); Wataru Takahashi, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 17/056,988

(22) PCT Filed: May 22, 2019

(86) PCT No.: PCT/JP2019/020196
§ 371 (c)(1),
(2) Date: Nov. 19, 2020

(87) PCT Pub. No.: WO2019/225628
PCT Pub. Date: Nov. 28, 2019

(65) Prior Publication Data
US 2021/0372396 A1    Dec. 2, 2021

(30) Foreign Application Priority Data
May 23, 2018   (JP) .............................. JP2018-099083

(51) Int. Cl.
*F16K 11/22*    (2006.01)
*F04B 49/22*    (2006.01)
(Continued)

(52) U.S. Cl.
CPC .............. *F04B 49/22* (2013.01); *F04B 27/18* (2013.01); *F16K 11/22* (2013.01); *G05D 7/0635* (2013.01); *Y10T 137/86702* (2015.04)

(58) Field of Classification Search
CPC .. F16K 11/22; F16K 11/24; Y10T 137/86702; F04B 49/22; F04B 27/18; G05D 7/0635
(Continued)

(56) References Cited

U.S. PATENT DOCUMENTS 2,267,515 A * 12/1941 Wilcox ............... F16K 31/0627
137/625.65
3,360,304 A * 12/1967 Adams ..................... B61K 7/12
303/18

(Continued)

FOREIGN PATENT DOCUMENTS

EP    2 784 320    10/2014    .............. F04B 27/18
EP    3 431 760    1/2019    .............. F04B 27/18
(Continued)

OTHER PUBLICATIONS

International Preliminary Report on Patentability issued in PCT/JP2019/020196, dated Nov. 24, 2020, with English translation, 6 pages.
(Continued)

*Primary Examiner* — William M McCalister
(74) *Attorney, Agent, or Firm* — Hayes Soloway P.C.

(57) ABSTRACT

A capacity control valve V includes a valve housing, a primary valve opened and closed by a driving force of a solenoid, a pressure-sensitive valve disposed in a pressure-sensitive chamber, and a differential pressure valve opened and closed by a differential pressure valve body moved by a pressure. A control port and a suction port communicate with each other through an intermediate communication path by opening and closing the pressure-sensitive valve. An
(Continued)

adapter is provided with an accommodation portion accommodating a differential pressure valve body, and first urging member and a second urging member are interposed in the accommodation portion on both sides of the differential pressure valve in an opening and closing direction with the differential pressure valve body interposed therebetween.

13 Claims, 10 Drawing Sheets

(51) Int. Cl.
  *F04B 27/18* (2006.01)
  *G05D 7/06* (2006.01)
(58) Field of Classification Search
  USPC .................................................. 137/625.68
  See application file for complete search history.

(56) References Cited

U.S. PATENT DOCUMENTS

| | | | | |
|---|---|---|---|---|
| 4,579,145 | A * | 4/1986 | Leiber | F16H 61/0251 137/625.65 |
| 4,615,358 | A * | 10/1986 | Hammond | F15B 13/0402 137/596.17 |
| 4,895,192 | A * | 1/1990 | Mortenson | F01M 11/04 137/625.68 |
| 4,917,150 | A * | 4/1990 | Koch | F16K 31/0606 137/625.65 |
| 4,979,542 | A * | 12/1990 | Mesenich | F02M 47/027 137/625.27 |
| 4,998,559 | A * | 3/1991 | McAuliffe, Jr. | F16H 61/0251 137/596.17 |
| 5,060,695 | A * | 10/1991 | McCabe | G05D 16/2024 137/625.61 |
| 5,217,047 | A * | 6/1993 | McCabe | F16H 61/0251 137/625.61 |
| 5,778,932 | A * | 7/1998 | Alexander | G05D 16/2024 137/625.65 |
| 6,161,585 | A * | 12/2000 | Kolchinsky | G05D 16/2024 137/625.65 |
| 6,354,811 | B1 | 3/2002 | Ota et al. | 417/222.2 |
| 6,358,017 | B1 | 3/2002 | Ota et al. | 417/222.2 |
| 6,361,283 | B1 | 3/2002 | Ota et al. | 417/222.2 |
| 8,021,124 | B2 | 9/2011 | Umemura et al. | 417/222.2 |
| 8,225,818 | B1 * | 7/2012 | Stephens | F15B 13/0442 137/625.68 |
| 9,022,346 | B2 * | 5/2015 | Najmolhoda | F16K 31/0613 251/50 |
| 9,027,598 | B2 * | 5/2015 | Schneider | F16K 31/0613 137/625.68 |
| 9,453,518 | B2 * | 9/2016 | Schulz | F15B 13/043 |
| 2002/0134444 | A1 | 9/2002 | Isobe | F16K 27/041 137/625.65 |
| 2004/0060604 | A1 | 4/2004 | Uemura et al. | 137/595 |
| 2005/0076959 | A1 * | 4/2005 | Yamamoto | F16K 31/0624 137/596.17 |
| 2006/0218953 | A1 | 10/2006 | Hirota | 62/228.5 |
| 2009/0183786 | A1 | 7/2009 | Iwa et al. | 137/487.5 |
| 2009/0256091 | A1 * | 10/2009 | Nordstrom | F16K 31/0613 251/129.15 |
| 2011/0089352 | A1 * | 4/2011 | Morgan | F16K 11/0716 251/129.15 |
| 2012/0198992 | A1 | 8/2012 | Futakuchi et al. | 91/505 |
| 2015/0027573 | A1 * | 1/2015 | Ochiai | F15B 13/0402 137/625.65 |
| 2015/0211506 | A1 | 7/2015 | Shirafuji et al. | F04B 27/1804 |
| 2015/0345655 | A1 | 12/2015 | Higashidozono et al. | F16K 31/0624 |
| 2017/0356430 | A1 | 12/2017 | Irie et al. | F04B 27/1804 |
| 2018/0156345 | A1 * | 6/2018 | Kanda | F15B 13/0431 |

FOREIGN PATENT DOCUMENTS

| | | | |
|---|---|---|---|
| JP | 5-306679 | 11/1993 | ............ F04B 27/08 |
| JP | 6-200875 | 7/1994 | ............ F04B 27/08 |
| JP | 2000-345961 | 12/2000 | ............ F04B 27/14 |
| JP | 2001-73939 | 3/2001 | ............ F04B 27/14 |
| JP | 2001-132632 | 5/2001 | ............ F04B 27/14 |
| JP | 2006-52648 | 2/2006 | ............ F04B 27/14 |
| JP | 2006-307828 | 11/2006 | ............ F04B 27/14 |
| JP | 4242624 | 1/2009 | ............ F04B 49/00 |
| JP | 4700048 | 3/2011 | ............ F04B 49/00 |
| JP | 5167121 | 12/2012 | ............ F04B 27/14 |
| JP | 5557901 | 6/2014 | ............ F04B 27/14 |
| JP | 2014-190247 | 10/2014 | ............ F04B 27/14 |
| JP | 2017-129042 | 7/2017 | ............ F04B 27/18 |
| JP | 6206274 | 10/2017 | ............ F04B 27/18 |
| JP | 2017-223348 | 12/2017 | ............ F16K 11/10 |
| JP | 2018-021646 | 2/2018 | ............ F04B 27/18 |
| JP | 2018-40385 | 3/2018 | ............ F16K 31/06 |
| JP | 2018-145877 | 9/2018 | ............ F04B 27/12 |
| WO | WO 2007/119380 | 10/2007 | ............ F04B 27/14 |
| WO | WO2013109005 | 7/2013 | ............ F04B 27/14 |
| WO | WO 2014/091975 | 6/2014 | ............ F04B 27/14 |
| WO | WO 2014/119594 | 8/2014 | ............ F04B 27/14 |
| WO | WO 2017/057160 | 4/2017 | ............ F04B 27/18 |
| WO | WO2017057160 | 4/2017 | ............ F04B 27/18 |
| WO | WO 2017/159553 | 9/2017 | ............ F04B 27/18 |
| WO | WO2018207461 | 11/2018 | ............ F04B 27/18 |
| WO | WO2019167912 | 2/2021 | ............ F04B 27/18 |

OTHER PUBLICATIONS

International Search Report and Written Opinion issued in PCT/JP2019/020196, dated Aug. 27, 2019, with English translation, 11 pages.
International Preliminary Report on Patentability issued in PCT/JP2019/047193, dated Dec. 3, 2021, with English translation, 6 pages.
International Search Report and Written Opinion issued in PCT/JP2019/047193, dated Aug. 27, 2019, with English translation, 11 pages.
International Search Report and Written Opinion issued in PCT/JP2019/002207, dated Apr. 23, 2019, with English translation, 13 pages.
International Preliminary Report on Patentability issued in PCT/JP2019/002207, dated Jul. 28, 2020, 7 pages.
International Search Report and Written Opinion issued in PCT/JP2019/005200, dated Apr. 23, 2019, with English Translation, 12 pages.
International Preliminary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, dated Sep. 3, 2020, 8 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.

(56) References Cited

OTHER PUBLICATIONS

International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
U.S. Appl. No. 17/299,288, filed Jun. 2, 2021, Fukudome et al.
U.S. Appl. No. 17/259,138, filed Jan. 8, 2021, Hayama et al.
U.S. Appl. No. 17/258,708, filed Jan. 7, 2021, Hayama et al.
U.S. Appl. No. 17/258,692, filed Jan. 7, 2021, Hayama et al.
U.S. Appl. No. 17/256,947, filed Dec. 29, 2020, Hayama et al.
U.S. Appl. No. 17/256,955, filed Dec. 29, 2020, Hayama et al.
U.S. Appl. No. 17/256,959, filed Dec. 29, 2020, Hayama et al.
U.S. Appl. No. 17/256,953, filed Dec. 29, 2020, Hayama et al.
U.S. Appl. No. 16/969,175, filed Aug. 11, 2020, Kurihara et al.
U.S. Appl. No. 16/967,693, filed Aug. 5, 2020, Hayama et al.
U.S. Appl. No. 16/967,692, filed Aug. 5, 2020, Hayama et al.
U.S. Appl. No. 16/962,786, filed Jul. 16, 2020, Hayama et al.

\* cited by examiner

CAPACITY CONTROL VALVE

TECHNICAL FIELD

The present invention relates to a capacity control valve for variably controlling a capacity of a working fluid and relates to, for example, a capacity control valve for controlling a discharge amount of a variable displacement compressor used in an air conditioning system of an automobile in response to a pressure.

BACKGROUND ART

A variable displacement compressor used in an air conditioning system of an automobile or the like includes a rotating shaft rotationally driven by an engine, a swash plate connected the rotating shaft so that an inclination angle is variable, a compression piston connected to the swash plate, and the like and changes the inclination angle of the swash plate so that a stroke amount of the piston is changed to control a discharge amount of a fluid. The inclination angle of the swash plate can be changed continuously by appropriately controlling a pressure inside a control chamber while using a suction pressure Ps of a suction chamber sucking a fluid by using a capacity control valve driven to be opened and closed by an electromagnetic force, a discharge pressure Pd of a discharge chamber discharging a fluid pressurized by the piston, and a control pressure Pc of the control chamber accommodating the swash plate.

When the variable displacement compressor is driven continuously (hereinafter, simply referred to as a "continuous driving state"), the capacity control valve is energized by a control computer and performs normal control in which a valve body is moved in the axial direction by an electromagnetic force generated in a solenoid and a primary valve is opened and closed to adjust the control pressure Pc of the control chamber of the variable displacement compressor.

During the normal control of the capacity control valve, the pressure of the control chamber of the variable displacement compressor is appropriately controlled and the inclination angle of the swash plate with respect to the rotating shaft is continuously changed to change the stroke amount of the piston so that the discharge amount of the fluid with respect to the discharge chamber is controlled and the air conditioning system is adjusted to have desired cooling capacity. Further, when the variable displacement compressor is driven with a maximum capacity, the primary valve of the capacity control valve is closed to decrease the pressure of the control chamber. Accordingly, the inclination angle of the swash plate is maximized.

In such a variable displacement compressor, when the variable displacement compressor is stopped and is left in a stop state for a long time, the suction pressure Ps, the discharge pressure Pd, and the control pressure Pc of the variable displacement compressor are equalized, the control pressure Pc and the suction pressure Ps are much higher than the control pressure Pc and the suction pressure Ps in the continuous driving state. When starting the variable displacement compressor from this state, it takes a long time until the discharge amount is controlled to a target value since the control pressure Pc is much higher than that in the continuous driving state. Thus, there is known a capacity control valve that discharges a fluid from the inside of the control chamber of the variable displacement compressor in a short time when starting the variable displacement compressor.

A capacity control valve shown in Patent Citation 1 includes a valve housing which communicates with the outside and is provided with a discharge port, a suction port, and a control port, a valve body which includes a primary valve portion coming into contact with and separating from a primary valve seat formed in the valve housing so as to open and close a communication between the discharge port and the control port and is opened and closed by a driving force of a solenoid, an intermediate communication path which communicates the control port with the suction port, a pressure-sensitive body which applies an urging force to the valve body in a valve opening direction of the primary valve in response to an ambient fluid pressure, an adapter which is provided in a free end of the pressure-sensitive body in a telescopic direction and comes into contact with and separates from a pressure-sensitive valve seat integrally provided in the valve body so as to open and close a communication between the control port and the suction port through the intermediate communication path, a differential pressure valve body including a differential pressure valve portion which comes into contact with and separates from a differential pressure valve seat formed on an inner radial side of the pressure-sensitive valve seat in response to a differential pressure in the adapter and opens and closes a communication between the control port and the suction port through the intermediate communication path, and a spring which is disposed inside the adapter and applies an urging force to the differential pressure valve body in the valve opening direction of the differential pressure valve. Further, the adapter is provided with a pressure introduction hole which introduces a fluid pressure from the control port into a space defined on the side of the bottom portion of the adapter by the differential pressure valve body and a slit which is formed in a front end portion of the adapter.

In the capacity control valve, when the differential pressure applied to the differential pressure valve body is small, a force in which the fluid pressure introduced from the pressure introduction hole moves the differential pressure valve body in the valve closing direction of the differential pressure valve and a force in which the fluid pressure introduced from the intermediate communication path moves the differential pressure valve body in the valve opening direction of the differential pressure valve are substantially balanced and the differential pressure valve body is moved by the urging force of the spring so that the differential pressure valve is opened. For this reason, a fluid can be discharged from the control port to the suction port through the intermediate communication path by the slit. Further, when the differential pressure valve is opened, the differential pressure valve body is brought into contact with the bottom portion of the adapter, so that the urging force of the spring is applied in the contraction direction of the pressure-sensitive body so as to assist the opening of the pressure-sensitive valve. Accordingly, it is easy to maintain a state in which the flow path cross-sectional area for discharging the fluid from the control port to the suction port is large.

CITATION LIST

Patent Literature

Patent Citation 1: JP 5557901 B2 (Page 6, FIG. 2)

SUMMARY OF INVENTION

Technical Problem

In this way, in the capacity control valve of Patent Citation 1, the differential pressure valve is opened by the differential pressure in the adapter and the differential pressure valve body is brought into contact with the bottom portion of the adapter so as to apply the urging force of the spring in the contraction direction of the pressure-sensitive body so that the opening of the pressure-sensitive valve is assisted. However, even when the differential pressure inside the adapter decreases and the differential pressure valve body starts to move in the valve opening direction of the differential pressure valve by receiving the urging force of the spring, the urging force of the spring cannot be applied to the pressure-sensitive body until the differential pressure valve body comes into contact with the bottom portion of the adapter. As a result, the responsiveness for the differential pressure is poor.

The present invention has been made in view of such problems and an object of the present invention is to provide a capacity control valve having good responsiveness for a differential pressure.

Solution to Problem

In order to solve the foregoing problems, a capacity control valve according to the present invention is a capacity control valve including: a valve housing which is provided with a discharge port, a suction port, and a control port; a valve body which constitutes a primary valve element coming into contact with and separating from a primary valve seat to close and open a communication between the discharge port and the control port by a driving force of a solenoid; a pressure-sensitive valve disposed in a pressure of a pressure-sensitive chamber provided with the control port, the pressure-sensitive valve being constituted by a pressure sensitive body and a pressure-sensitive valve member that extends from the valve body to the pressure-sensitive chamber; and a differential pressure valve which is provided on an inner radial side of an adapter of the pressure-sensitive valve and includes a differential pressure valve seat and a differential pressure valve body moved by a pressure, wherein an intermediate communication path is formed in the valve body and the pressure-sensitive valve member, the control port and the suction port communicating with each other through the intermediate communication path in accordance with opening and closing action of the pressure-sensitive valve, wherein the adapter of the pressure-sensitive valve is provided with an accommodation portion accommodating the differential pressure valve body, a pressure introduction path communicating the control port with the accommodation portion, and a differential pressure communication path communicating the control port with the suction port when opening the differential pressure valve, and wherein a first urging member and a second urging member are interposed in the accommodation portion of the adapter so as to sandwich the differential pressure valve body in an opening and closing direction of the differential pressure valve. According to the aforesaid feature of the present invention, when the differential pressure in the accommodation portion decreases, the differential pressure valve body is moved by the urging force of the first urging member and the second urging member in the valve opening direction of the differential pressure valve so that the differential pressure valve can be opened. At the same time, since the urging force of the first urging member is transmitted to the adapter through the second urging member while the pressure-sensitive valve is closed, the urging force can serve as a force to contract the pressure-sensitive body. Accordingly, since the opening of the pressure-sensitive valve can be assisted, the responsiveness of the capacity control valve for the differential pressure can be increased.

It may be preferable that the first urging member and the second urging member in the accommodation portion mutually apply urging forces generated by compression at all times. According to this preferable configuration, the opening of the pressure-sensitive valve can be assisted at all times by the urging force of the first urging member and the second urging member.

It may be preferable that a pressure introduction space which communicates with the pressure-sensitive chamber through the pressure introduction path is formed by the differential pressure valve body and the accommodation portion, and the differential pressure valve body is provided with a through-hole which allows the intermediate communication path to communicate with the pressure introduction space. According to this preferable configuration, since a fluid can flow between the intermediate communication path and the pressure introduction space through the through-hole, the differential pressure valve body in the accommodation portion can be easily moved in the opening and closing direction of the differential pressure valve.

It may be preferable that the differential pressure valve body is provided with a protrusion portion brought into contact with the adapter within an elastic deformation range of the second urging member. According to this preferable configuration, since the protrusion portion of the differential pressure valve body is brought into contact with the adapter within the elastic deformation range of the second urging member, an excessive load is not applied to the second urging member.

It may be preferable that the differential pressure valve body is located on a side of the pressure introduction space with respect to the differential pressure communication path within the elastic deformation range of the second urging member in which the protrusion portion is capable of coming into contact with the adapter. According to this preferable configuration, since the differential pressure valve body moves in the elastic deformation range of the second urging member, the movement can be smooth.

It may be preferable that the first urging member and the second urging member are opposed to each other through the differential pressure valve body. According to this preferable configuration, the first urging member and the second urging member can be stably disposed.

DESCRIPTION OF EMBODIMENTS

Modes for implementing a capacity control valve according to the present invention will be described below on the basis of embodiments.

First Embodiment

A capacity control valve according to a first embodiment of the present invention will be described with reference to FIGS. 1 to 7. Hereinafter, the left and right sides as viewed from the front side in FIG. 2 will be described as the left and right sides of the capacity control valve.

A capacity control valve V of the present invention is incorporated in a variable displacement compressor M used in an air conditioning system of an automobile or the like and variably controls a pressure of a working fluid (hereinafter, simply referred to as a "fluid") which is a refrigerant so that a discharge amount of the variable displacement compressor M is controlled to adjust the air conditioning system to a desired cooling capacity.

Figure 1:
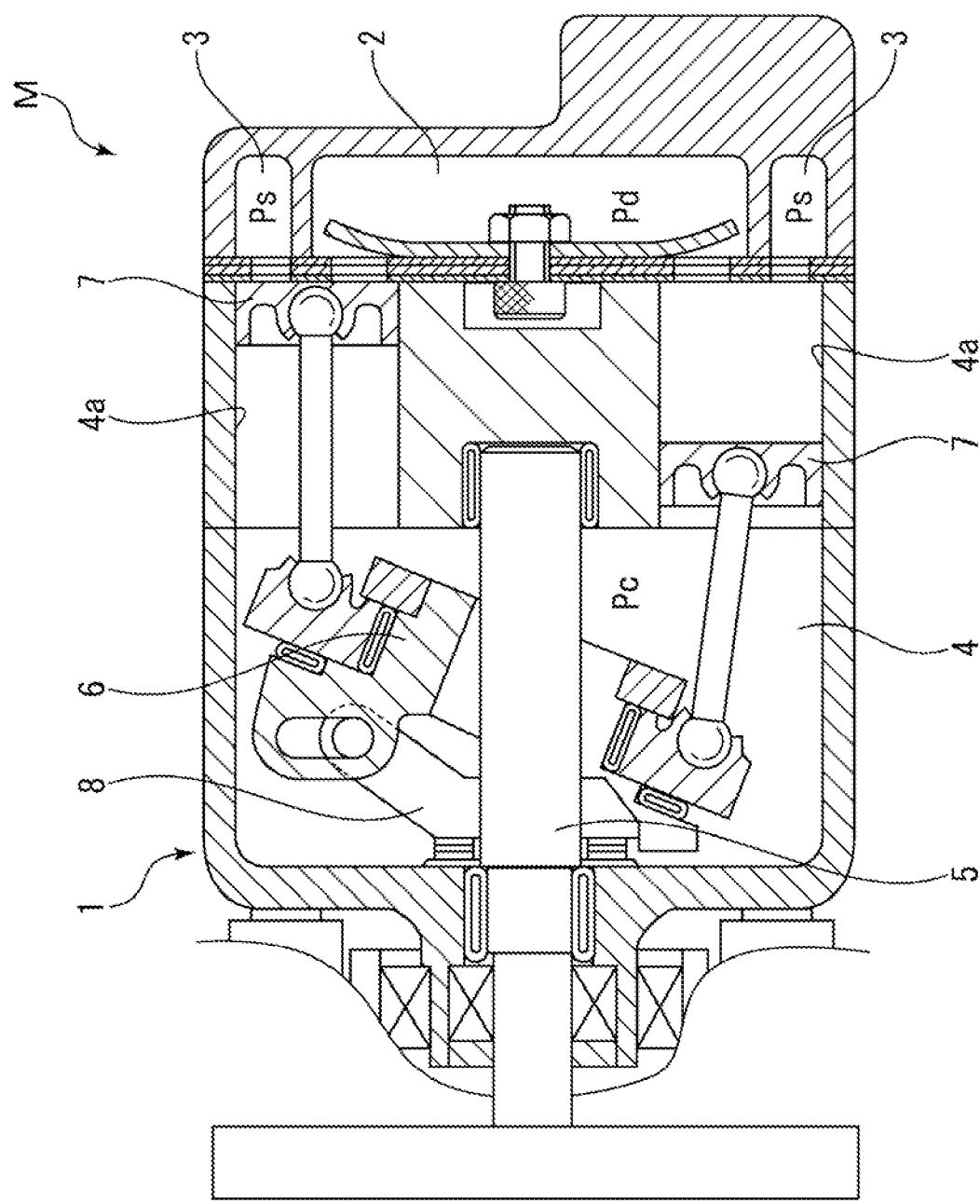
FIG. 1 is a schematic configuration diagram showing a swash plate type variable displacement compressor incorporated with a capacity control valve according to a first embodiment of the present invention.

First, the variable displacement compressor M will be described. As shown in FIG. 1, the variable displacement compressor M includes a casing 1 having a discharge chamber 2, a suction chamber 3, a control chamber 4, and a plurality of cylinders 4a. In addition, the variable displacement compressor M is provided with a communication path (not shown) allowing the control chamber 4 and the suction chamber 3 to directly communicate with each other and this communication path is provided with a fixed orifice for adjusting a pressure between the suction chamber 3 and the control chamber 4 in a balanced state.

Further, the variable displacement compressor M includes a rotating shaft 5 which is rotationally driven by an engine (not shown) installed outside the casing 1, a swash plate 6 which is eccentrically connected to the rotating shaft 5 inside the control chamber 4 by a hinge mechanism 8, and a plurality of pistons 7 which are connected to the swash plate 6 and are fitted so as to be movable in a reciprocating manner inside the respective cylinders 4a and continuously changes an inclination angle of the swash plate 6 by appropriately controlling a pressure inside the control chamber 4 while using a suction pressure Ps of the suction chamber 3 sucking a fluid by using the capacity control valve V driven to be opened and closed by an electromagnetic force, a discharge pressure Pd of the discharge chamber 2 discharging a fluid pressurized by the piston 7, and a control pressure Pc of the control chamber 4 accommodating the swash plate 6 so that a stroke amount of the piston 7 is changed to control a discharge amount of the fluid. Further, for convenience of description, the capacity control valve V incorporated in the variable displacement compressor M is omitted in FIG. 1.

Specifically, the inclination angle of the swash plate 6 with respect to the rotating shaft 5 becomes smaller so that the stroke amount of the piston 7 decreases as the control pressure Pc inside the control chamber 4 becomes higher. However, when the pressure becomes a certain level or more, the swash plate 6 is substantially perpendicular to the rotating shaft 5, that is, slightly inclined from the vertical state. At this time, since the stroke amount of the piston 7 is minimized and the pressurization of the fluid inside the cylinder 4a by the piston 7 is minimized, the discharge amount of the fluid to the discharge chamber 2 decreases and the cooling capacity of the air conditioning system is minimized. On the other hand, the inclination angle of the swash plate 6 with respect to the rotating shaft 5 becomes larger so that the stroke amount of the piston 7 increases as the control pressure Pc inside the control chamber 4 becomes lower. However, when the pressure becomes a certain level or less, the inclination angle of the swash plate 6 with respect to the rotating shaft 5 is maximized. At this time, since the stroke amount of the piston 7 is maximized and the pressurization of the fluid inside the cylinder 4a by the piston 7 is maximized, the discharge amount of the fluid to the discharge chamber 2 increases and the cooling capacity of the air conditioning system is maximized.

Figure 2:
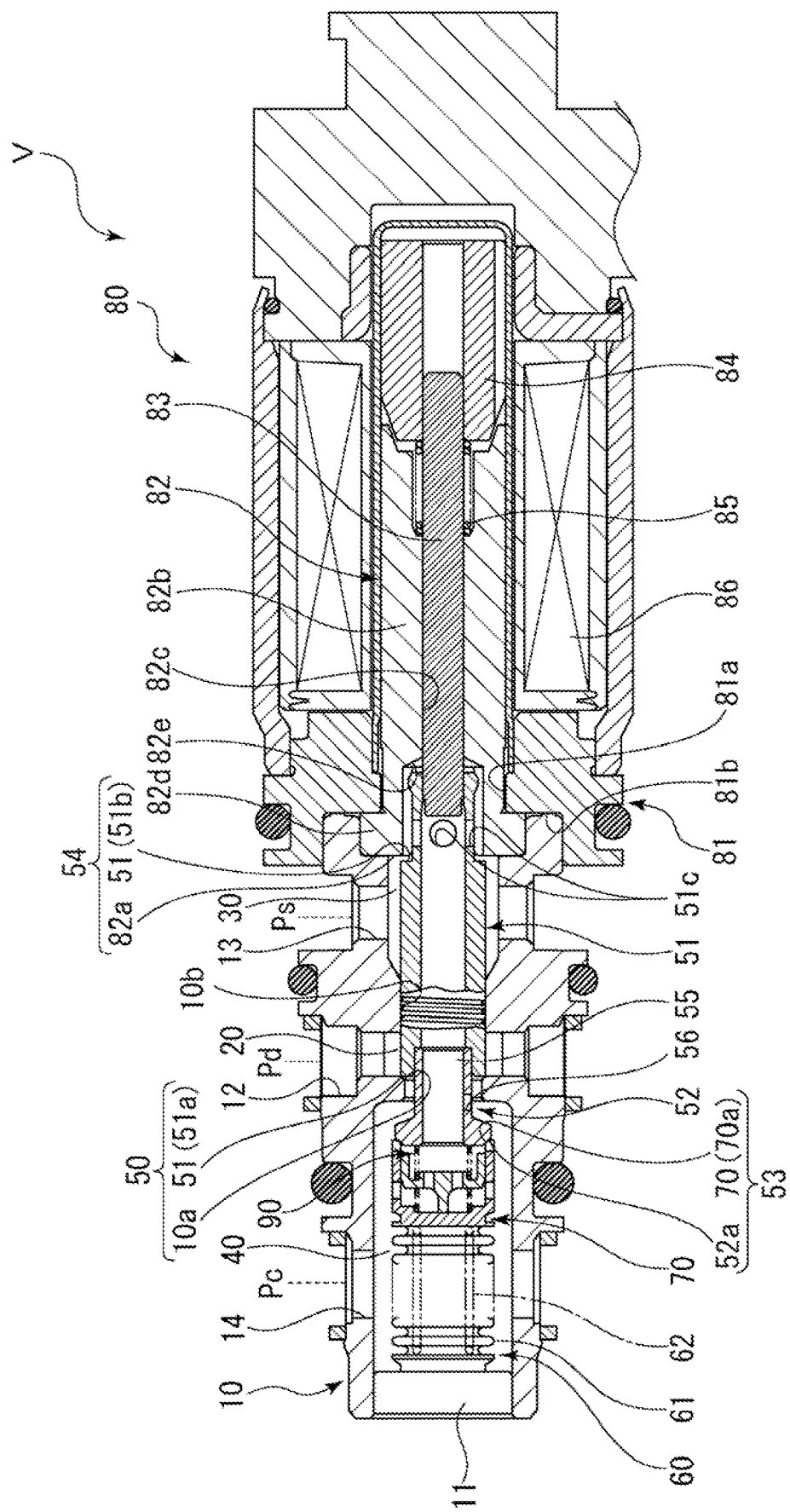
FIG. 2 is a cross-sectional view showing a state in which a primary valve is closed, a pressure-sensitive valve is closed, and a differential pressure valve is opened when the capacity control valve according to the first embodiment is energized (e.g., started).

As shown in FIG. 2, the capacity control valve V incorporated in the variable displacement compressor M adjusts a current flowing through a coil 86 constituting a solenoid 80 so as to control the opening and closing of a primary valve 50 and a sub-valve 54 of the capacity control valve V and to control the opening and closing of a pressure-sensitive valve 53 by an ambient fluid pressure so that the fluid flowing into the control chamber 4 or flowing out from the control chamber 4 is controlled to variably control the control pressure Pc inside the control chamber 4.

In this embodiment, the primary valve 50 includes a primary sub-valve body 51 which is a valve body and a primary valve seat 10a which is formed in an inner peripheral surface of a valve housing 10 and a left axial end 51a of the primary sub-valve body 51 comes into contact with and separates from the primary valve seat 10a. The sub-valve 54 includes the primary sub-valve body 51 and a sub-valve seat 82a formed in an opening end surface, that is, a left axial end surface of a fixed iron core 82 and a right axial step portion 51b of the primary sub-valve body 51 comes into contact with and separates from the sub-valve seat 82a. The pressure-sensitive valve 53 includes an adapter 70 constituting a pressure-sensitive body 60 and a pressure-sensitive valve seat 52a formed in a left axial end portion of a pressure-sensitive valve member 52 and a right axial end 70a of the adapter 70 comes into contact with and separates from the pressure-sensitive valve seat 52a.

Next, a structure of the capacity control valve V will be described. As shown in FIG. 2, the capacity control valve V mainly includes the valve housing 10 which is formed of a metal material or a resin material, the primary sub-valve body 51 and the pressure-sensitive valve member 52 which are disposed inside the valve housing 10 so as to be movable in a reciprocating manner in the axial direction, the pressure-sensitive body 60 which applies an urging force to the primary sub-valve body 51 and the pressure-sensitive valve member 52 to the right axial side in response to an ambient fluid pressure, the solenoid 80 which is connected to the valve housing 10 and applies a driving force to the primary sub-valve body 51 and the pressure-sensitive valve member 52, and a differential pressure valve 90 which is provided inside the adapter 70. In this embodiment, the differential pressure valve 90 includes a differential pressure valve body 91 to be described later and a differential pressure valve seat 52b formed in the left axial end of the pressure-sensitive valve member 52 and the inner radial side of the pressure-sensitive valve seat 52a and a right axial end 91a of the differential pressure valve body 91 comes into contact with and separates from the differential pressure valve seat 52b (see FIGS. 4 to 6).

As shown in FIG. 2, the solenoid 80 mainly includes a casing 81 which has an opening portion 81a opening to a left axial side, a substantially cylindrical fixed iron core 82 which is inserted into the opening portion 81a of the casing 81 from the left axial side and is fixed to the inner radial side of the casing 81, a drive rod 83 which is disposed on the inner radial side of the fixed iron core 82 so as to be movable in a reciprocating manner in the axial direction and of which the left axial end portion is connected and fixed to the primary sub-valve body 51, a movable iron core 84 which is fixed to the right axial end portion of the drive rod 83, a coil spring 85 which is provided between the fixed iron core 82 and the movable iron core 84 and urges the movable iron core 84 to the right axial side, and the excitation coil 86 which is wound on the outside of the fixed iron core 82 via a bobbin.

The casing 81 is provided with a concave portion 81b which is recessed rightward in the axial direction from the radial center of the left axial end and the right axial end portion of the valve housing 10 is inserted and fixed to the concave portion 81b.

The fixed iron core 82 includes a cylindrical portion 82b which is formed of a rigid body corresponding to a magnetic material such as iron or silicon steel and is provided with an insertion hole 82c extending in the axial direction and allowing the drive rod 83 to be inserted therethrough and an annular flange portion 82d which extends outward in the radial direction from the outer peripheral surface of the left axial end portion of the cylindrical portion 82b and a concave portion 82e is formed so as to be recessed rightward in the axial direction from the radial center of the left axial end of the cylindrical portion 82b.

As shown in FIG. 2, the valve housing 10 has a substantially cylindrical shape with a bottom by press-inserting a partition adjustment member 11 into the left axial end portion. The primary sub-valve body 51 and the pressure-sensitive valve member 52 are disposed inside the valve housing 10 so as to be movable in a reciprocating manner in the axial direction and a part of the inner peripheral surface of the valve housing 10 is provided with a small-diameter guide surface 10b on which the outer peripheral surface of the primary sub-valve body 51 is slidable. In addition, the partition adjustment member 11 can adjust the urging force of the pressure-sensitive body 60 by adjusting the installation position of the valve housing 10 in the axial direction.

Further, a primary valve chamber 20 in which the side of the left axial end 51a of the primary sub-valve body 51 is disposed, a sub-valve chamber 30 which is formed on the back pressure side, that is, the right axial side of the primary sub-valve body 51, and a pressure-sensitive chamber 40 which is formed at a position on the side opposite to the sub-valve chamber 30 with respect to the primary valve chamber 20 are formed inside the valve housing 10. In addition, the sub-valve chamber 30 is defined by the outer peripheral surface on the back pressure side of the primary sub-valve body 51, the opening end surface, that is, the left axial end surface and the concave portion 82e of the fixed iron core 82, and the inner peripheral surface on the right axial side in relation to the guide surface 10b of the valve housing 10.

Further, the valve housing 10 is provided with a Pd port 12 which is a discharge port communicating the primary valve chamber 20 with the discharge chamber 2 of the variable displacement compressor M, a Ps port 13 which is a suction port communicating the sub-valve chamber 30 with the suction chamber 3 of the variable displacement compressor M, and a Pc port 14 which is a control port communicating the pressure-sensitive chamber 40 with the control chamber 4 of the variable displacement compressor M.

As shown in FIG. 2, the primary sub-valve body 51 is formed in a substantially cylindrical shape, the pressure-sensitive valve member 52 having a substantially cylindrical shape and a substantially turret shape in the side view is connected and fixed to the left axial end portion, the drive rod 83 is connected and fixed to the right axial end portion, and these components are moved in the axial direction together. Further, an intermediate communication path 55 which penetrates in the axial direction by connecting hollow holes is formed inside the primary sub-valve body 51 and the pressure-sensitive valve member 52. In addition, the intermediate communication path 55 communicates with the sub-valve chamber 30 through a plurality of through-holes 51c penetrating the right axial end portion of the primary sub-valve body 51 in the radial direction.

Further, the pressure-sensitive valve member 52 is provided with an auxiliary communication path 56 which communicates the pressure-sensitive chamber 40 with the intermediate communication path 55. In addition, the auxiliary communication path 56 functions as a fixed orifice that adjusts a pressure in a balanced state between the pressure-sensitive chamber 40 and the intermediate communication path 55.

As shown in FIG. 2, the pressure-sensitive body 60 mainly includes the bellows core 61 in which the coil spring 62 is embedded and the adapter 70 which is formed in the right axial end portion, that is, the free end in the telescopic direction of the bellows core 61 and the left axial end of the bellows core 61 is fixed to the partition adjustment member 11.

Further, the pressure-sensitive body 60 is disposed inside the pressure-sensitive chamber 40 and the right axial end 70a of the adapter 70 sits on the pressure-sensitive valve seat 52a of the pressure-sensitive valve member 52 by the urging force of moving the adapter 70 to the right axial side by the coil spring 62 and the bellows core 61. Further, the adapter 70 receives a force of moving the adapter 70 to the left axial side in response to an ambient fluid pressure. In addition, when the suction pressure Ps inside the intermediate communication path 55 is high or the pressure of the pressure-sensitive chamber 40 is high, the pressure-sensitive body 60 contracts due to an ambient fluid pressure and the right axial end 70a of the adapter 70 is operated so as to separate from the pressure-sensitive valve seat 52a of the pressure-sensitive valve member 52 so that the pressure-sensitive valve 53 is opened (see FIG. 3).

As shown in FIGS. 3 to 6, the adapter 70 is formed in a substantially cylindrical shape with a bottom by a cylindrical portion 70b and a bottom portion 70c formed in the left axial end portion of the cylindrical portion 70b and an accommodation portion 70d opening to the right axial side is formed inside the adapter 70. Further, the adapter 70 is provided with a pressure introduction hole 70e which is formed as a plurality of pressure introduction paths penetrating the left axial end portion of the cylindrical portion 70b in the radial direction and a slit 70f which is formed as a plurality of differential pressure communication paths extending in the right axial end portion of the cylindrical portion 70b, that is, the right axial end 70a of the adapter 70.

The differential pressure valve body 91 is formed in a substantially cylindrical shape with a bottom by a cylindrical portion 91b and a bottom portion 91c formed in the left axial end portion of the cylindrical portion 91b and is fitted into the accommodation portion 70d of the adapter 70. In addition, the outer peripheral surface of the cylindrical portion 91b of the differential pressure valve body 91 and the inner peripheral surface of the cylindrical portion 70b of the adapter 70 slightly separate from each other in the radial direction so that a minute gap is formed therebetween and the differential pressure valve body 91 is movable smoothly in the axial direction.

Further, the accommodation portion 70d of the adapter 70 is divided by the differential pressure valve body 91 into a space S1 which is formed the right axial side so as to be continuous to the intermediate communication path 55 and a space S2 which is formed on the left axial side and is provided as a pressure introduction space communicating with the pressure-sensitive chamber 40 through the pressure introduction hole 70e. Further, the bottom portion 91c of the differential pressure valve body 91 is provided with a plurality of through-holes 91d penetrating therethrough in the axial direction and the spaces S1 and S2 formed in the accommodation portion 70d of the adapter 70 communicate with each other by the through-hole 91d. In addition, although the diameter of the through-hole 91d is shown large for convenience of description, but the through-hole 91d only needs to be formed in a size that allows a fluid to flow between the spaces S1 and S2.

Further, the differential pressure valve body 91 in the accommodation portion 70d of the adapter 70 is urged by a coil spring 92 corresponding to first urging member interposed on the side of the space S1 in the valve opening direction of the differential pressure valve 90, that is, to the left axial side and is urged by a coil spring 93 corresponding to second urging member interposed on the side of the space S2 in the valve closing direction of the differential pressure valve, that is, to the right axial side. In addition, the coil springs 92 and 93 are so-called compression springs and are disposed so as to face each other in the axial direction with the bottom portion 91c of the differential pressure valve body 91 interposed therebetween in the accommodation portion 70d of the adapter 70 so that the coil springs 92 and 93 mutually apply urging forces generated by compression at all times.

The coil spring 92 is inserted and fitted into an annular concave portion 91e provided in the bottom portion 91c of the differential pressure valve body 91 in the accommodation portion 70d of the adapter 70 and is fixed while the left axial end comes into contact with the right axial end surface of the bottom portion 91c of the differential pressure valve body 91 and the right axial end comes into contact with the left axial end surface of the pressure-sensitive valve member 52. Further, the coil spring 93 is internally fitted into the concave portion 70g provided in the bottom portion 70c of the adapter 70 and is fixed while the left axial end comes into contact with the right axial end surface of the bottom portion 70c of the adapter 70 and the right axial end comes into contact with the left axial end surface of the bottom portion 91c of the differential pressure valve body 91.

Further, the differential pressure valve body 91 is provided with a protrusion portion 91f which protrudes from the radial center of the left axial end surface of the bottom portion 91c to the side of the space S2, that is, the left axial side. The left axial end of the protrusion portion 91f can come into contact with the right axial end surface of the bottom portion 70c of the adapter 70 in the elastic deformation range of the coil spring 93 (see FIGS. 3 and 4). In addition, the differential pressure valve body 91 is formed so that the right axial end 91a enters the left axial side in relation to the slit 70f provided in the right axial end 70a of the adapter 70 while the left axial protrusion portion 91f comes into contact with the bottom portion 70c of the adapter 70.

Next, an opening and closing mechanism of the differential pressure valve 90 will be described. In a state in which the control pressure Pc and the suction pressure Ps applied to the differential pressure valve body 91 from both sides in the axial direction are balanced (Pc=Ps), the pressure applied from the space S1 in the valve opening direction, that is, to the left axial side of the differential pressure valve 90 and the pressure applied from the space S2 in the valve closing direction, that is, to the right axial side of the differential pressure valve 90 have substantially the same pressure receiving area in the differential pressure valve body 91 disposed inside the accommodation portion 70d of the adapter 70. For this reason, the pressure applied to the differential pressure valve body 91 from both sides in the axial direction is balanced, the differential pressure valve body 91 moves to the left axial side by the urging force of the coil springs 92 and 93, and the right axial end 91a of the differential pressure valve body 91 separates from the differential pressure valve seat 52b so that the differential pressure valve 90 is opened (see FIG. 4). In addition, in the differential pressure valve body 91, the pressure receiving surface that receives the pressure from the space S1 which is the intermediate communication path 55 in the valve opening direction of the differential pressure valve 90, that is, the right axial end surface of the bottom portion 91c and the right axial end 91a of the differential pressure valve body 91 faces the pressure receiving surface that receives the pressure from the space S2 in the valve closing direction, that is, the left axial end surface of the bottom portion 91c and the protrusion portion 91f in the axial direction.

On the other hand, in a state in which the suction pressure Ps of the sub-valve chamber 30 communicating with the suction chamber 3 is lower than the control pressure Pc of the pressure-sensitive chamber 40 communicating with the control chamber 4 (Pc>Ps), the pressure applied from the space S1 which is the intermediate communication path 55 to the differential pressure valve body 91 becomes smaller than the pressure applied from the space S2 into which the control pressure Pc is introduced from the pressure-sensitive chamber 40 through the pressure introduction hole 70e. That is, a differential pressure is generated in the axial direction, a force (indicated by a white arrow in FIG. 5) is applied to the differential pressure valve body 91 to the right axial side, and the differential pressure valve body 91 moves to the right axial side against the urging force of the coil spring 92 so that the differential pressure valve 90 is closed (see FIG. 5).

Figure 3:
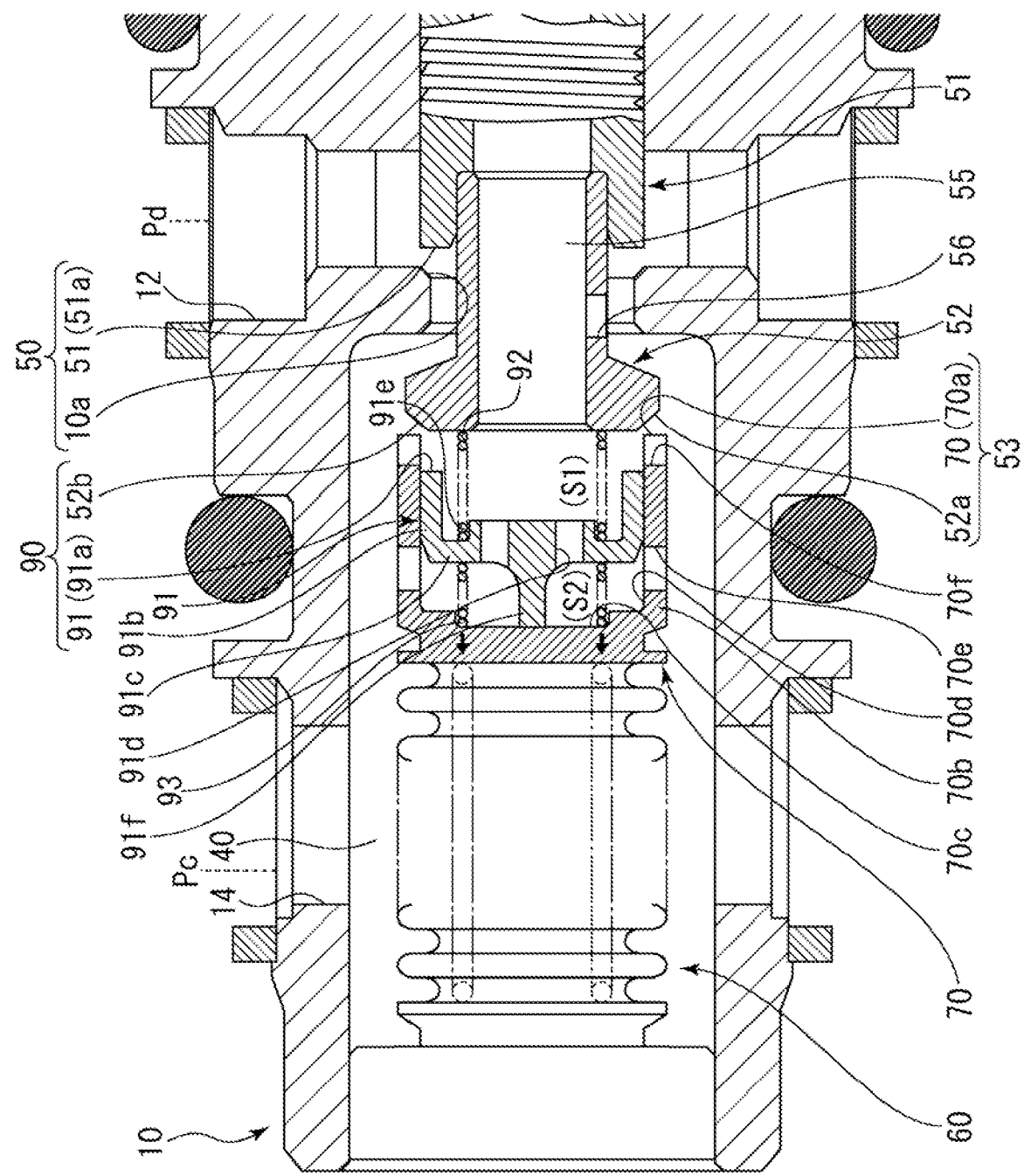
FIG. 3 is a cross-sectional view showing a state in which the primary valve is opened, the pressure-sensitive valve is opened, and the differential pressure valve is opened when the capacity control valve according to the first embodiment is not energized.

Next, a case in which the capacity control valve V is maintained in a non-energized state will be described. As shown in FIG. 3, when the capacity control valve V is in the non-energized state, the movable iron core 84 is pressed to the right axial side by the urging force of the coil spring 85 constituting the solenoid 80 or the urging force of the coil spring 62 and the bellows core 61, the drive rod 83, the primary sub-valve body 51, and the pressure-sensitive valve member 52 move to the right axial side, and the right axial step portion 51b of the primary sub-valve body 51 sits on the sub-valve seat 82a of the fixed iron core 82 so that the sub-valve 54 is closed. At this time, the left axial end 51a of the primary sub-valve body 51 separates from the primary valve seat 10a formed in the inner peripheral surface of the valve housing 10 so that the primary valve 50 is opened.

In this way, when the capacity control valve V is in the non-energized state, the fluid in the discharge chamber 2 of the variable displacement compressor M flows from the discharge chamber 2 into the control chamber 4 through the capacity control valve V when the primary valve 50 is opened. This is because the discharge pressure Pd is higher than the control pressure Pc.

Since the discharge pressure Pd flows into the control chamber 4 through the capacity control valve V, the control pressure Pc is higher than the control pressure Pc before the non-energized state, is higher than the suction pressure Ps, and is expressed by a relational expression of Pd≥Pc>Ps. For that reason, a fluid inside the control chamber 4 flows into the suction chamber 3 through the communication path and the fixed orifice directly communicating the control chamber 4 with the suction chamber 3. The inflow of the fluid is performed until the discharge pressure Pd, the suction pressure Ps, and the control pressure Pc are balanced. For that reason, when the capacity control valve V is left in the non-energized state for a long time, the discharge pressure Pd, the suction pressure Ps, and the control pressure Pc are balanced and equalized (i.e., Pd=Pc=Ps) and the suction pressure Ps and the control pressure Pc are much higher than the pressure in the continuous driving state. At this time, a part of the fluid inside the control chamber 4 may be liquefied. In addition, since the control pressure Pc of the control chamber 4 and the suction pressure Ps of the suction chamber 3 are balanced and equalized, in the capacity control valve V, the pressure applied to the differential pressure valve body 91 disposed inside the accommodation portion 70d of the adapter 70 from both sides in the axial direction, that is, the sides of the spaces S1 and S2 is balanced. For this reason, the differential pressure valve body 91 moves to the left axial side by the urging force of the coil springs 92 and 93 so that the differential pressure valve 90 is opened (see FIG. 3). Further, when the pressure-sensitive body 60 contracts, the right axial end 70a of the adapter 70 separates from the pressure-sensitive valve seat 52a of the pressure-sensitive valve member 52 so that the pressure-sensitive valve 53 is opened (see FIG. 3). Further, in a state in which the differential pressure valve 90 is opened and the protrusion portion 91f comes into contact with the bottom portion 70c of the adapter 70, the urging force of the coil springs 92 and 93 is transmitted to the adapter 70 through the protrusion portion 91f so as to serve as a force to contract the pressure-sensitive body 60. Accordingly, the opening of the pressure-sensitive valve 53 is assisted.

Next, a case until a liquefied fluid is discharged from the inside of the control chamber 4 through the capacity control valve V when starting the variable displacement compressor M will be described.

When the coil 86 of the solenoid 80 is energized and excited to generate a magnetic force from the non-energized state of the capacity control valve V shown in FIG. 3, that is, a state in which the primary valve 50 is opened, the primary sub-valve body 51 moves to the left axial side and the left axial end 51a of the primary sub-valve body 51 sits on the primary valve seat 10a formed in the inner peripheral surface of the valve housing 10 so that the primary valve 50 is closed. At this time, the right axial step portion 51b of the primary sub-valve body 51 separates from the sub-valve seat 82a of the fixed iron core 82 so that the sub-valve 54 is opened (see FIG. 2).

Further, since the suction pressure Ps of the suction chamber 3 slightly decreases due to the stroke of the piston 7 when starting the variable displacement compressor M, a pressure difference between the control pressure Pc of the control chamber 4 and the suction pressure Ps of the suction chamber 3 generates a flow of a fluid flowing from the inside of the pressure-sensitive chamber 40 provided with the Pc port 14 to the intermediate communication path 55 through the pressure-sensitive valve 53 and the differential pressure valve 90 and flowing to the Ps port 13 through the sub-valve 54 in the capacity control valve V (see FIG. 2).

Accordingly, in the capacity control valve V of this embodiment, since the liquefied refrigerant of the control chamber 4 can be discharged by opening the differential pressure valve 90 and communicating the Pc port 14 with the Ps port 13 when starting the variable displacement compressor M, the liquefied fluid is discharged through the differential pressure valve 90 in a short time and hence the responsiveness during start-up can be increased. In addition, since the pressure inside the pressure-sensitive chamber 40 decreases as the liquefied refrigerant of the control chamber 4 is discharged, the pressure-sensitive body 60 expands and the right axial end 70a of the adapter 70 sits on the pressure-sensitive valve seat 52a of the pressure-sensitive valve member 52 so that the pressure-sensitive valve 53 is closed (see FIG. 4).

Figure 4:
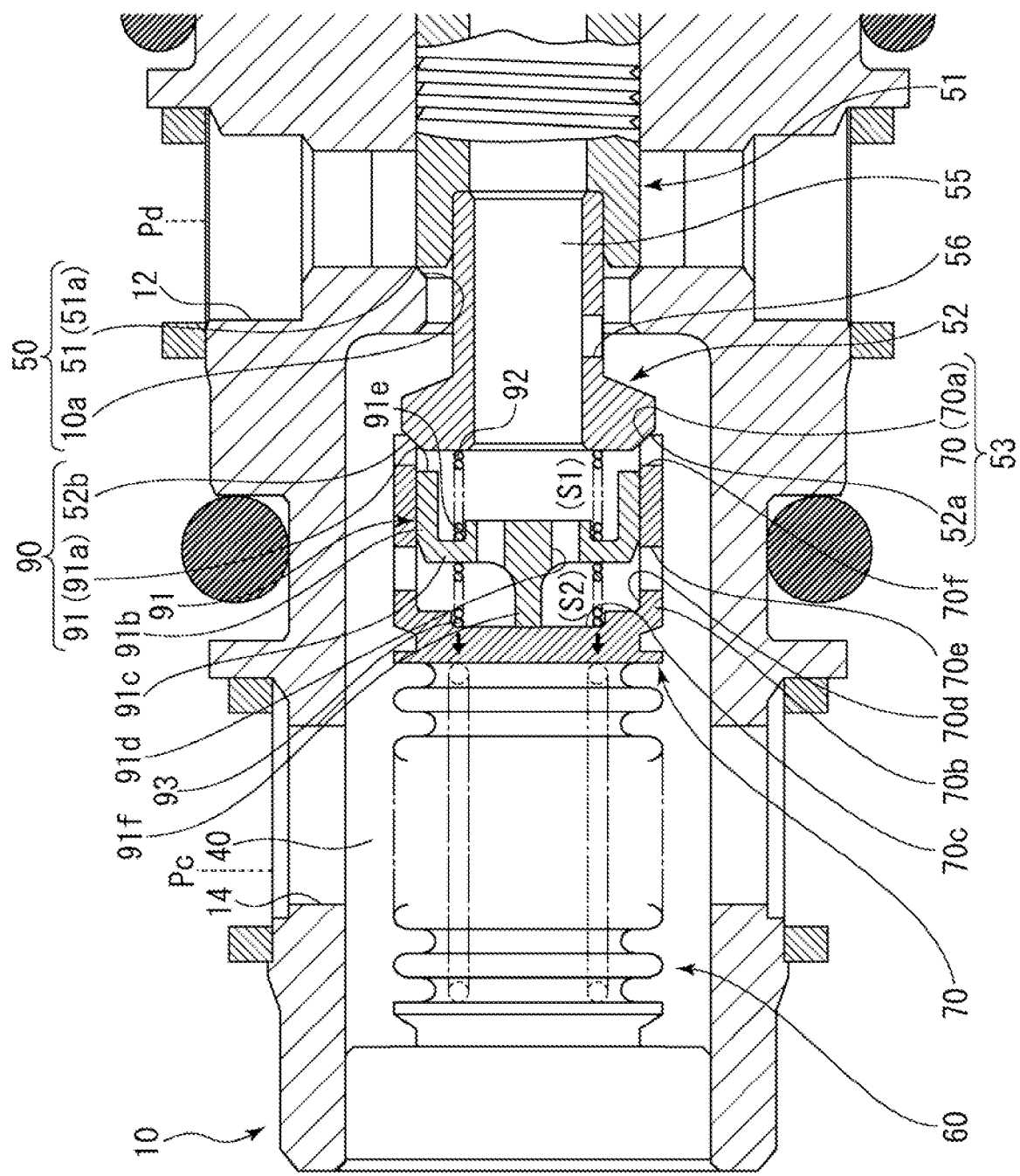
FIG. 4 is an enlarged cross-sectional view of FIG. 2 showing a state in which the primary valve is closed, the pressure-sensitive valve is closed, and the differential pressure valve is opened when the capacity control valve according to the first embodiment is energized (e.g., started).
Figure 5:
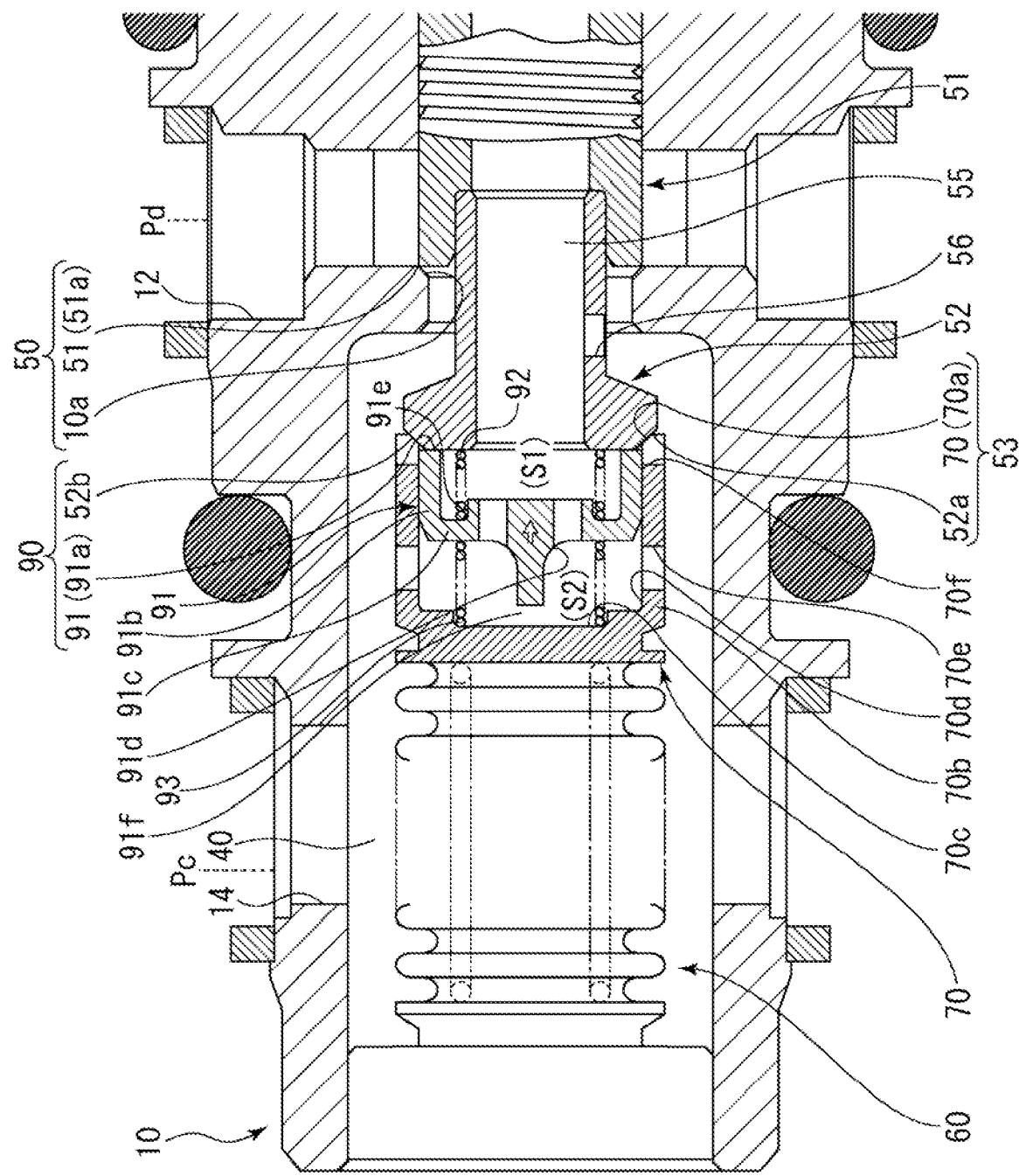
FIG. 5 is an enlarged cross-sectional view showing a state in which the primary valve is closed, the pressure-sensitive valve is closed, and the differential pressure valve is closed when the capacity control valve according to the first embodiment is energized (e.g., during normal control).

Next, the case of the normal control of the capacity control valve V when the variable displacement compressor M is in the continuous driving state will be described. As shown in FIG. 4, when the capacity control valve V is in the maximum capacity state, the coil 86 of the solenoid 80 is energized and excited to generate a magnetic force so that the primary sub-valve body 51 moves to the left axial side. Accordingly, the left axial end 51a of the primary sub-valve body 51 sits on the primary valve seat 10a formed in the inner peripheral surface of the valve housing 10 so that the primary valve 50 is closed. At this time, the right axial step portion 51b of the primary sub-valve body 51 separates from the sub-valve seat 82a formed in the opening end surface of the fixed iron core 82 so that the sub-valve 54 is opened. Further, since the control pressure Pc and the suction pressure Ps are maintained in a balanced state (Pc=Ps) in the maximum capacity state, the differential pressure valve body 91 is moved to the left axial side by the urging force of the coil springs 92 and 93 and the right axial end 91a of the differential pressure valve body 91 separates from the differential pressure valve seat 52b so that the differential pressure valve 90 is opened.

Accordingly, in the capacity control valve V of this embodiment, even when the pressure of the pressure-sensitive chamber 40, that is, the control pressure Pc is low and the pressure-sensitive valve 53 is not opened, the control pressure Pc and the suction pressure Ps can be maintained at the equal pressure (i.e., same pressure) by opening the differential pressure valve 90 and communicating the Pc port 14 with the Ps port 13 through the slit 70f provided in the right axial end 70a of the adapter 70. For that reason, since the stroke of the piston 7 inside the cylinder 4a of the control chamber 4 is stabilized and the maximum capacity state is maintained, the operation efficiency can be increased. Here, both the differential pressure valve 90 and the pressure-sensitive valve 53 are opened by the differential pressure between the control pressure Pc and the suction pressure Ps, but the differential pressure valve 90 is set to be operated at the differential pressure smaller than that of the pressure-sensitive valve 53.

Figure 6:
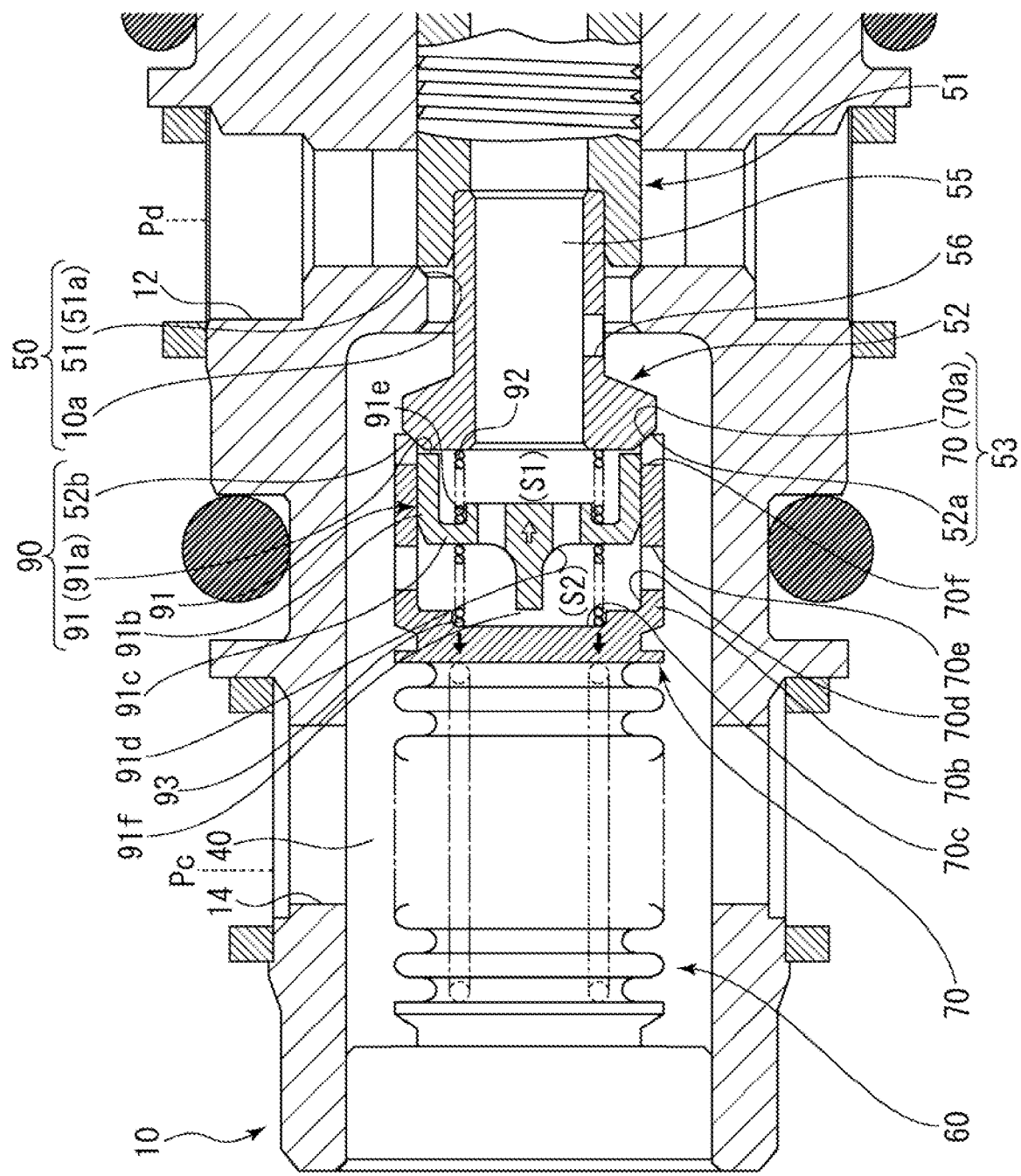
FIG. 6 is an enlarged cross-sectional view showing a state in which an urging force is applied to a pressure-sensitive body via a coil spring after the differential pressure valve is proportionally controlled to be opened and closed in response to a differential pressure inside an accommodation portion from a state of FIG. 5 when the capacity control valve according to the first embodiment is energized (e.g., during normal control).

Further, in the accommodation portion 70d of the adapter 70, when the differential pressure inside the accommodation portion 70d, that is, the differential pressure between the spaces S1 and S2 decreases, the differential pressure valve body 91 can be moved by the urging force of the coil springs 92 and 93 in the valve opening direction of the differential pressure valve 90. At the same time, since the urging force of the coil spring 92 applied in the valve opening direction of the differential pressure valve 90 is transmitted to the adapter 70 through the coil spring 93 while the pressure-sensitive valve 53 is closed, the urging force can serve as a force (indicated by a solid arrow in FIGS. 3 and 4) to contract the pressure-sensitive body 60. Further, as shown in FIG. 6, even in a state in which the differential pressure valve body 91 separates from the differential pressure valve seat 52b and the protrusion portion 91f separates from the bottom portion 70c of the adapter 70, the urging force of the coil spring 92 is transmitted to the adapter 70 through the coil spring 93 and can serve as a force (indicated by a solid arrow in FIG. 6) to contract the pressure-sensitive body 60, so that the responsiveness of the capacity control valve V for the differential pressure can be increased.

Further, since the differential pressure valve 90 can be proportionally controlled to be opened and closed by moving the differential pressure valve body 91 in the valve opening direction while being balanced in response to the differential pressure inside the accommodation portion 70d by the urging force applied to the differential pressure valve body 91 at all times by the coil springs 92 and 93, the control pressure Pc can be continuously changed by the capacity control valve V and hence the control accuracy during normal control can be increased.

Further, since the differential pressure valve body 91 is provided with the through-hole 91d which communicates the spaces S1 and S2 formed in the accommodation portion 70d of the adapter 70, a fluid can flow between the spaces S1 and S2 through the through-hole 91d. For this reason, the differential pressure valve body 91 can be easily moved in the opening and closing direction of the differential pressure valve 90 inside the accommodation portion 70d. Further, when the suction pressure Ps is applied through the through-hole 91d from the space S1 corresponding to the intermediate communication path 55 to the space S2 into which the control pressure Pc is introduced from the pressure-sensitive chamber 40 through the pressure introduction hole 70e, the differential pressure inside the accommodation portion 70d, that is, between the spaces S1 and S2 decreases and the differential pressure valve body 91 can be easily moved in the valve opening direction of the differential pressure valve 90 inside the accommodation portion 70d. For this reason, the responsiveness of the capacity control valve V for the differential pressure can be further increased.

Further, since the differential pressure valve body 91 is provided with the protrusion portion 91f which comes into contact with the bottom portion 70c of the adapter 70 in the elastic deformation range of the coil spring 93, the deformation (for example, the contraction) of the coil spring 93 is suppressed in the elastic deformation range and no excessive load is applied to the coil spring 93. As a result, breakage or the like can be prevented.

Further, since the differential pressure valve body 91 is disposed on the left axial side in relation to the slit 70f, that is, the side of the space S2 in the elastic deformation range of the coil spring 93 in which the protrusion portion 91f comes into contact with the bottom portion 70c of the adapter 70 when the differential pressure valve 90 is opened, the differential pressure valve body 91 moves in the elastic deformation range of the coil spring 93 and thus the movement is smooth. Further, since a large movement range of the differential pressure valve body 91 can be secured inside the accommodation portion 70d, the urging force of the coil spring 92 applied to the differential pressure valve 90 in the valve opening direction can be transmitted to the adapter 70 through the coil spring 93 for a long time until the protrusion portion 91f of the differential pressure valve body 91 comes into contact with the bottom portion 70c of the adapter 70. Further, since the coil springs 92 and 93 are disposed inside the accommodation portion 70d of the adapter 70 together with the differential pressure valve body 91, the capacity control valve V including the differential pressure valve 90 can be made compact.

Further, the differential pressure valve body 91 is internally fitted to the accommodation portion 70d of the adapter 70 and is held from both sides in the axial direction by the coil springs 92 and 93 and in this state, the outer peripheral surface of the cylindrical portion 91b of the differential pressure valve body 91 is guided by the inner peripheral surface of the cylindrical portion 70b of the adapter 70. Accordingly, since the opening and closing operation of the differential pressure valve 90 can be smoothly performed, the structure of the differential pressure valve 90 can be simplified.

Further, in the differential pressure valve body 91, since the pressure receiving surface that receives the pressure from the space S1 corresponding to the intermediate communication path 55 in the valve opening direction of the differential pressure valve 90 is disposed so as to axially face the pressure receiving surface that receives the pressure from the space S2 in the valve closing direction, the inclination of the differential pressure valve body 91 is difficult, the axial movement of the differential pressure valve body 91 is smooth, and the arrangement of the coil springs 92 and 93 is stable.

Figure 7:
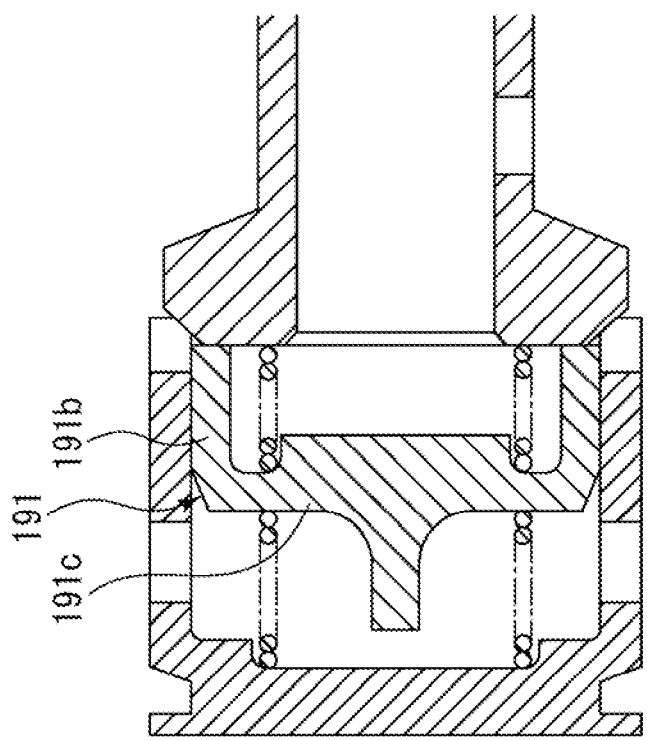
FIG. 7 is a main enlarged cross-sectional view showing a modified example of the capacity control valve according to the first embodiment.

In addition, an example in which the through-hole 91d is provided in the bottom portion 91c of the differential pressure valve body 91 has been described, but the through-hole may be provided in the cylindrical portion 91b. Further, as a modified example of the differential pressure valve body 91, as shown in FIG. 7, a bottom portion 191c of a differential pressure valve body 191 may have a substantially solid disk shape and a cylindrical portion 191b thereof may have a substantially solid cylindrical shape. Then, a through-hole may not be provided in the bottom portion 191c or the cylindrical portion 191b of the differential pressure valve body 191.

Second Embodiment

Figure 8:
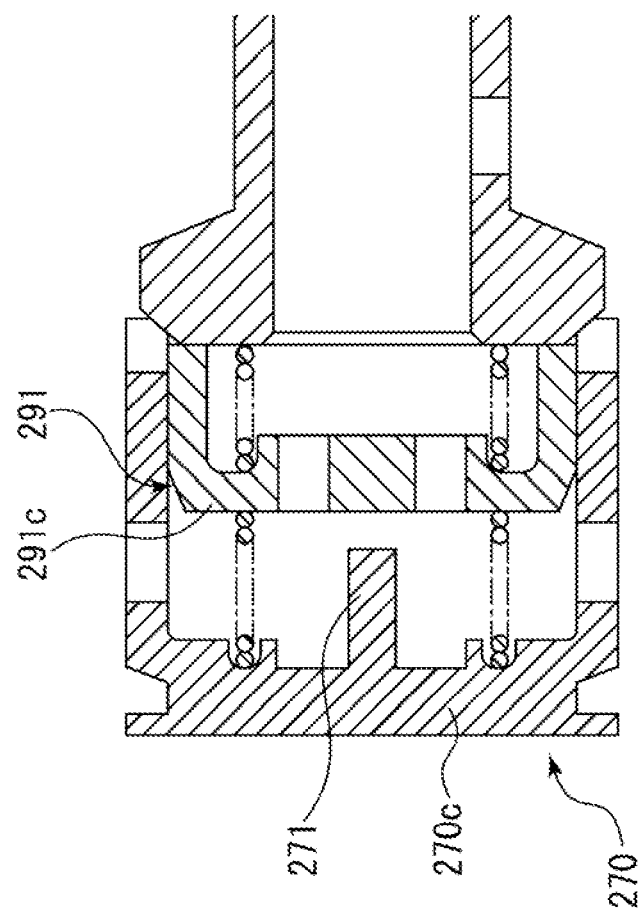
FIG. 8 is a main enlarged cross-sectional view showing a capacity control valve according to a second embodiment of the present invention.

Next, a capacity control valve according to a second embodiment of the present invention will be described with reference to FIG. 8. In addition, the same components as those of the above-described embodiment will be denoted by the same reference numerals and redundant description will be omitted.

A capacity control valve V of the second embodiment will be described. As shown in FIG. 8, in this embodiment, a differential pressure valve body 291 has a substantially planar shape on the side of an adapter 270 of a bottom portion 291c and the bottom portion 291c is not provided with a protrusion portion which extends toward the adapter 270. On the other hand, the bottom portion 270c of the adapter 270 is provided with a protrusion portion 271 which extends toward the differential pressure valve body 291. Accordingly, the structure of the differential pressure valve body 291 can be simplified and the movement of the differential pressure valve body 291 can be made smooth.

Third Embodiment

Figure 9:
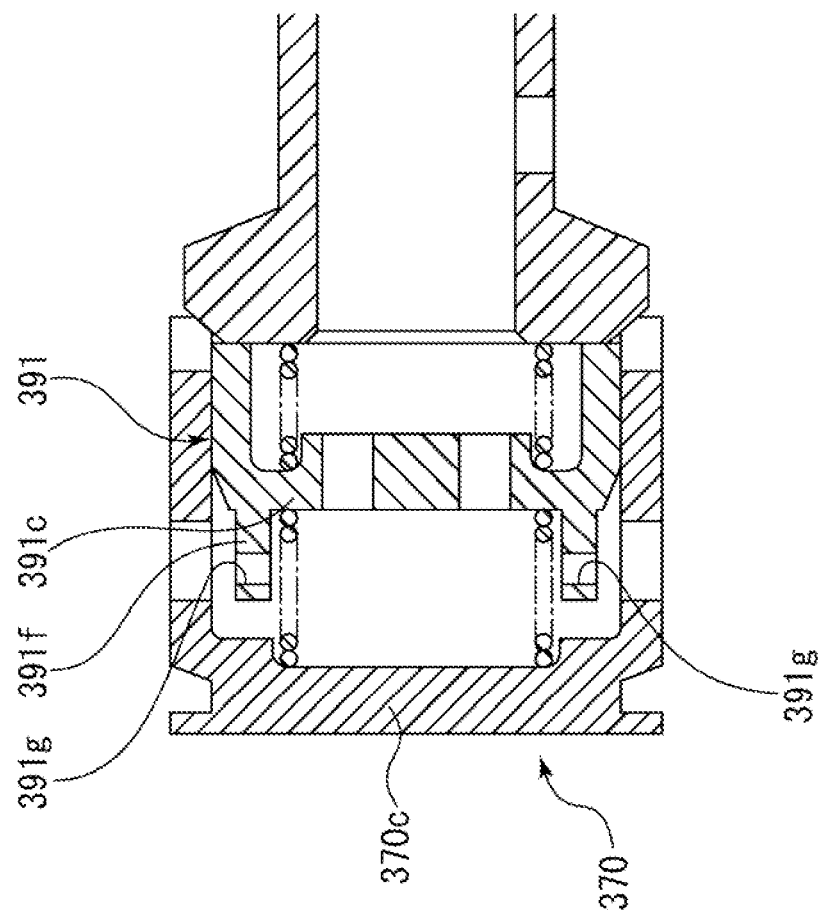
FIG. 9 is a main enlarged cross-sectional view showing a capacity control valve according to a third embodiment of the present invention.

Next, a capacity control valve according to a third embodiment of the present invention will be described with reference to FIG. 9. In addition, the same components as those of the above-described embodiment will be denoted by the same reference numerals and redundant description will be omitted.

A capacity control valve V of the third embodiment will be described. As shown in FIG. 9, in this embodiment, a differential pressure valve body 391 is provided with a cylindrical protrusion portion 391f formed on an outer radial side of a bottom portion 391c so as to extend toward an adapter 370. The protrusion portion 391f is provided with a through-hole 391g which penetrates therethrough in the radial direction. Accordingly, since the protrusion portion 391f has a cylindrical shape, the differential pressure valve body 391 is stably supported when the front end portion of the protrusion portion 391f comes into contact with a bottom portion 370c of the adapter 370. In addition, the front end portion of the protrusion portion 391f may be provided with a notch instead of the through-hole 391g.

Fourth Embodiment

Figure 10:
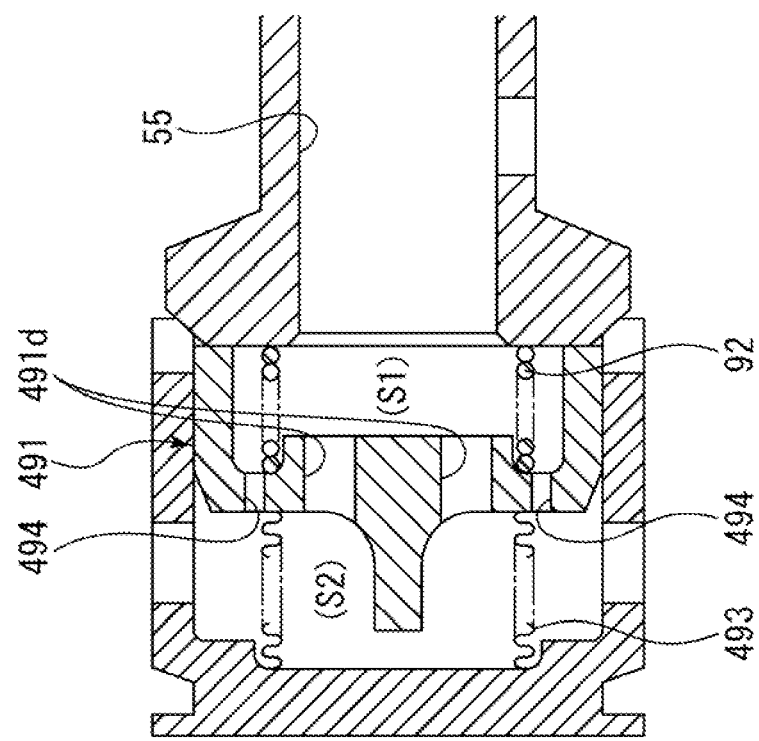
FIG. 10 is a main enlarged cross-sectional view showing a capacity control valve according to a fourth embodiment of the present invention.

Next, a capacity control valve according to a fourth embodiment of the present invention will be described with reference to FIG. 10. In addition, the same components as those of the above-described embodiment will be denoted by the same reference numerals and redundant description will be omitted.

A capacity control valve V of the fourth embodiment will be described. As shown in FIG. 10, in this embodiment, a differential pressure valve body 491 is urged from the space S2 by a bellows core 493 which is second urging member disposed so as to axially face the coil spring 92 provided in the space S1. Further, the differential pressure valve body 491 is provided with a through-hole 491d which is formed on the inner radial side of the bellows core 493 and is provided with a through-hole 494 which is formed on the outer radial side of the bellows core 493. Accordingly, the suction pressure Ps can be introduced from the space S1 which is the intermediate communication path 55 into the bellows core 493 on the side of the space S2 through the through-hole 491d and the pressure receiving surface of the control pressure Pc applied in the valve closing direction, that is, to the right axial side of the differential pressure valve 90 from the space S2 with respect to the differential pressure valve body 91 can be decreased. For this reason, the differential pressure valve 90 can be easily opened at an early stage when the control pressure Pc and the suction pressure Ps approach an equal pressure and the responsiveness of the capacity control valve V for the differential pressure can be increased.

Although the embodiments of the present invention have been described above with reference to the drawings, a detailed configuration is not limited to these embodiments and modifications or additions in the scope not departing from the spirit of the present invention are also included in the present invention.

For example, a communication path and a fixed orifice directly communicating the control chamber 4 and the suction chamber 3 of the variable displacement compressor M with each other may not be provided.

Further, in the above-described embodiments, the sub-valve may not be provided and the right axial end of the valve body constituting the primary valve may function as a support member that receives an axial load and does not essentially need a sealing function.

Further, the differential pressure valve and the Pc port may be provided inside the second valve chamber.

Further, the sub-valve chamber 30 may be provided on the side opposite to the solenoid 80 in the axial direction and the pressure-sensitive chamber 40 may be provided on the side of the solenoid 80.

Further, the coil springs 92 and 93 are not limited to compression springs, but may be tension springs or have a shape other than a coil shape.

Further, the pressure-sensitive body 60 may not use a coil spring therein.

REFERENCE SIGNS LIST

1 Casing
2 Discharge chamber
3 Suction chamber
4 Control chamber
10 Valve housing
10a Primary valve seat
11 Partition adjustment member
12 Pd port (discharge port)
13 Ps port (suction port)
14 Pc port (control port)
20 Primary valve chamber
30 Sub-valve chamber
40 Pressure-sensitive chamber
50 Primary valve
51 Primary sub-valve body (valve body)
52 Pressure-sensitive valve member
52a Pressure-sensitive valve seat
52b Differential pressure valve seat
53 Pressure-sensitive valve
54 Sub-valve
55 Intermediate communication path
56 Auxiliary communication path
60 Pressure-sensitive body
61 Bellows core
62 Coil spring
70 Adapter
70b Cylindrical portion
70c Bottom portion
70d Accommodation portion
70e Pressure introduction hole (pressure introduction path)
70f Slit (differential pressure communication path)
70g Concave portion
80 Solenoid
82 Fixed iron core 82a Sub-valve seat
90 Differential pressure valve
91 Differential pressure valve body
91b Cylindrical portion
91c Bottom portion
91d Through-hole
91e Annular concave portion
91f Protrusion portion
92 Coil spring (first urging member)
93 Coil spring (second urging member)
191 Differential pressure valve body
191b Cylindrical portion
191c Bottom portion
270 Adapter
270c Bottom portion
271 Protrusion portion
291 Differential pressure valve body
291c Bottom portion
370 Adapter
370c Bottom portion
391 Differential pressure valve body
391c Bottom portion
391f Protrusion portion
391g Through-hole
491 Differential pressure valve body
491d Through-hole
493 Bellows core (second urging member)
494 Through-hole
S1 Space
S2 Space (pressure introduction space)
Pc Control pressure
Pd Discharge pressure
Ps Suction pressure
V Capacity control valve

The invention claimed is:

1. A capacity control valve comprising:
a valve housing which is provided with a discharge port, a suction port, and a control port;
a valve body which constitutes a primary valve element coming into contact with and separating from a primary valve seat to close and open a communication between the discharge port and the control port by a driving force of a solenoid;
a pressure-sensitive valve disposed in a pressure-sensitive chamber provided with the control port, the pressure-sensitive valve being constituted by a pressure sensitive body and a pressure-sensitive valve member that extends from the valve body to the pressure-sensitive chamber; and
a differential pressure valve which is provided on an inner radial side of an adapter of the pressure-sensitive valve and includes a differential pressure valve seat and a differential pressure valve body moved by a pressure,
wherein an intermediate communication path is formed in the valve body and the pressure-sensitive valve member, the control port and the suction port communicating with each other through the intermediate communication path in accordance with opening and closing action of the pressure-sensitive valve,
wherein the adapter of the pressure-sensitive valve is provided with an accommodation portion accommodating the differential pressure valve body, a pressure introduction path communicating the control port with the accommodation portion, and a differential pressure communication path communicating the control port with the suction port when opening the differential pressure valve, and
wherein a first urging member and a second urging member are interposed in the accommodation portion of the adapter so as to sandwich the differential pressure valve body in an opening and closing direction of the differential pressure valve.

2. The capacity control valve according to claim 1, wherein the first urging member and the second urging member in the accommodation portion mutually apply urging forces generated by compression at all times.

3. The capacity control valve according to claim 1, wherein a pressure introduction space which communicates with the pressure-sensitive chamber through the pressure introduction path is formed by the differential pressure valve body and the accommodation portion, and
wherein the differential pressure valve body is provided with a through-hole which allows the intermediate communication path to communicate with the pressure introduction space.

4. The capacity control valve according to claim 3, wherein the differential pressure valve body is provided with a protrusion portion brought into contact with the adapter within an elastic deformation range of the second urging member.

5. The capacity control valve according to claim 4, wherein the differential pressure valve body is located on a side of the pressure introduction space with respect to the differential pressure communication path within the elastic deformation range of the second urging member in which the protrusion portion is capable of coming into contact with the adapter.

6. The capacity control valve according to claim 1, wherein the first urging member and the second urging member are opposed to each other through the differential pressure valve body.

7. The capacity control valve according to claim 2, wherein a pressure introduction space which communicates with the pressure-sensitive chamber through the pressure introduction path is formed by the differential pressure valve body and the accommodation portion, and
wherein the differential pressure valve body is provided with a through-hole which allows the intermediate communication path to communicate with the pressure introduction space.

8. The capacity control valve according to claim 7, wherein the differential pressure valve body is provided with a protrusion portion brought into contact with the adapter within an elastic deformation range of the second urging member.

9. The capacity control valve according to claim 8, wherein the differential pressure valve body is located on a side of the pressure introduction space with respect to the differential pressure communication path within the elastic deformation range of the second urging member in which the protrusion portion is capable of coming into contact with the adapter.

10. The capacity control valve according to claim 2, wherein the first urging member and the second urging member are opposed to each other through the differential pressure valve body.

11. The capacity control valve according to claim 3, wherein the first urging member and the second urging member are opposed to each other through the differential pressure valve body.

12. The capacity control valve according to claim 4,
wherein the first urging member and the second urging member are opposed to each other through the differential pressure valve body.

13. The capacity control valve according to claim 5,
wherein the first urging member and the second urging member are opposed to each other through the differential pressure valve body.

* * * * *